(12) United States Patent
Kishi et al.

(10) Patent No.: US 7,774,094 B2
(45) Date of Patent: Aug. 10, 2010

(54) SELECTING A SOURCE CLUSTER BY MEASURING SYSTEM FACTORS, CALCULATING A MOUNT-TO-DISMOUNT LIFESPAN, AND SELECTING THE SOURCE CLUSTER IN RESPONSE TO THE LIFESPAN AND A USER POLICY

(75) Inventors: Gregory T. Kishi, Oro Valley, AZ (US); Thirumale N. Niranjan, Bangalore (IN); Jonathan W. Peake, Tucson, AZ (US); Mark A. Reid, Castle Way, AZ (US); Joseph M. Swingler, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 519 days.

(21) Appl. No.: 11/770,486

(22) Filed: Jun. 28, 2007

(65) Prior Publication Data

US 2009/0006734 A1    Jan. 1, 2009

(51) Int. Cl.
*G06F 7/00* (2006.01)
(52) U.S. Cl. ........................ 700/213; 700/214; 709/217; 711/4; 711/118; 711/154; 369/30.06; 369/30.28; 369/30.64; 369/178.01; 360/98.01
(58) Field of Classification Search ............... 711/4, 711/113, 118, 154; 369/30.06, 30.28, 30.64, 369/178.01; 360/98.01; 700/213, 214, 245; 709/217

See application file for complete search history.

(56) References Cited

U.S. PATENT DOCUMENTS

| 6,618,818 | B1 | 9/2003 | Wahl et al. ..................... 714/6 |
| 7,020,758 | B2 | 3/2006 | Fisk ........................... 711/172 |
| 2003/0236961 | A1 | 12/2003 | Qui et al. .................... 711/170 |
| 2004/0047354 | A1 | 3/2004 | Slater et al. ................. 370/400 |
| 2005/0229032 | A1 | 10/2005 | Kusama et al. ................. 714/6 |
| 2008/0126330 | A1* | 5/2008 | Stern et al. ..................... 707/5 |
| 2008/0239544 | A1* | 10/2008 | Saliba ......................... 360/71 |
| 2008/0313403 | A1* | 12/2008 | Niranjan et al. ............. 711/120 |

FOREIGN PATENT DOCUMENTS

| EP | 0935186 | 8/1999 |
| EP | 1674983 | 6/2006 |
| JP | 63046534 | 2/1988 |
| JP | 10320126 | 12/1998 |

* cited by examiner

*Primary Examiner*—Hong Kim
(74) *Attorney, Agent, or Firm*—Kunzler Needham Massey & Thorpe (57) ABSTRACT

An apparatus, system, and method are disclosed for selecting a source cluster in a distributed storage configuration. A measurement module measures system factors for a plurality of clusters over a plurality of instances. The clusters are in communication over a network and each cluster comprises at least one tape volume cache. A smoothing module applies a smoothing function to the system factors, wherein recent instances have higher weights. A lifespan module calculates a mount-to-dismount lifespan for each cluster from the smoothed system factors. A selection module selects a source cluster for accessing an instance of a specified volume in response to the mount-to-dismount lifespans and a user policy.

35 Claims, 9 Drawing Sheets

SELECTING A SOURCE CLUSTER BY MEASURING SYSTEM FACTORS, CALCULATING A MOUNT-TO-DISMOUNT LIFESPAN, AND SELECTING THE SOURCE CLUSTER IN RESPONSE TO THE LIFESPAN AND A USER POLICY

BACKGROUND OF THE INVENTION

1. Field of the Invention

This invention relates to clusters and more particularly relates to selecting a cluster.

2. Description of the Related Art

A storage system may include a plurality of tape drives that are used to access a plurality of magnetic tapes using a library manager. The magnetic tapes may be disposed within cartridges. A controller may direct an actuator to move a tape cartridge from a storage area to tape drive in order to access data written on the magnetic tape and/or to write data to the magnetic tape.

Storage systems may be located at multiple sites including multiple geographically distinct sites. The storage systems may communicate over one or more networks. Each storage system may include a plurality of clusters. Each cluster may include a plurality of tape drives. Magnetic tapes are mounted to the tape drives in order to read data from and write data to the magnetic tapes.

Each magnetic tape may be organized as one or more logical volumes, referred to herein as volumes. A volume may appear to a host as a distinct storage device. A volume may be logically "mounted" on a virtual tape drive. As used herein, a virtual tape drive is a logical construct that appears to a host as a tape drive.

Operations such as read operations and write operations for a virtual tape drive mounting a logical volume may be routed through a tape volume cache (TVC). The TVC may include a rapidly accessible storage device such as a hard disk drive. The storage device may cache data to the TVC. Thus the TVC may cache data that is read from the logical volume and/or cache data that is to be written to the logical volume. For example, a host may make repeated writes to a logical volume. The TVC may store the written data on a hard disk drive without writing the data to the logical volume's magnetic tape. At a later time, the TVC may write the cached data to the magnetic tape.

The storage systems may maintain multiple consistent copies of volumes. Two or more clusters with consistent copies may be able to provide access to the volumes. Unfortunately, a host has no way of determining which of the clusters should be used to most advantageously access a specified volume.

SUMMARY OF THE INVENTION

From the foregoing discussion, there is a need for an apparatus, system, and method that select a cluster. Beneficially, such an apparatus, system, and method would reduce a latency for accessing a volume by selecting a cluster with an affinity for the volume.

The present invention has been developed in response to the present state of the art, and in particular, in response to the problems and needs in the art that have not yet been fully solved by currently available cluster selection methods. Accordingly, the present invention has been developed to provide an apparatus, system, and method for selecting a cluster that overcome many or all of the above-discussed shortcomings in the art.

The apparatus to select a cluster is provided with a plurality of modules configured to functionally execute the steps of measuring system factors, applying a smoothing function, calculating a mount-to-dismount lifespan, and selecting a cluster. These modules in the described embodiments include a measurement module, a smoothing module, a lifespan module, and a selection module.

The measurement module comprises a computer readable program executing on a processor and measures system factors for a plurality of clusters over a plurality of instances. The clusters are in communication over a network. Each cluster comprises at least one TVC.

The smoothing module comprises a computer readable program executing on the processor and applies a smoothing function to the system factors. Recent system factor instances are given higher weights.

The lifespan module comprises a computer readable program executing on the processor and calculates a mount-to-dismount lifespan for each cluster from the smoothed system factors. The selection module comprises a computer readable program executing on the processor and selects a source cluster for accessing an instance of a specified volume in response to the mount-to-dismount lifespans and a user policy. The apparatus selects the source cluster with an affinity for the specified volume, reducing latency for accessing the specified volume.

A system of the present invention is also presented to select a cluster. The system may be embodied in a plurality of storage systems. In particular, the system, in one embodiment, includes a network and a plurality of sites.

Each site includes at least one host and a storage system. Each storage system includes a plurality of clusters. Each cluster includes at least one tape drive that accesses volumes stored on a magnetic tape, at least one TVC, and a cluster manager.

The cluster manager includes a processor and a memory and executes computer readable programs. The computer readable programs include a measurement module, a smoothing module, a communication module, a calculation module, and a selection module.

The measurement module measures system factors for the plurality of clusters over a plurality of instances. The smoothing module applies a smoothing function to the system factors, wherein recent instances have higher weights. The communication module communicates smoothed system factors between the measurement modules of the sites. The lifespan module calculates a mount-to-dismount lifespan for each cluster from the smoothed system factors. The selection module selects a source cluster for accessing an instance of a specified volume in response to the mount-to-dismount lifespans and a user policy. The system calculates mount-to-dismount lifespans for selecting the source cluster.

A method of the present invention is also presented for selecting a cluster. The method in the disclosed embodiments substantially includes the steps to carry out the functions presented above with respect to the operation of the described apparatus and system. In one embodiment, the method includes measuring system factors, applying a smoothing function, calculating a mount-to-dismount lifespan, and selecting a cluster.

A measurement module measures system factors for a plurality of clusters over a plurality of instances. The clusters are in communication over a network and each cluster comprises at least one tape volume cache. A smoothing module applies a smoothing function to the system factors, wherein recent instances have higher weights. A lifespan module calculates a mount-to-dismount lifespan for each cluster from the smoothed system factors. A selection module selects a source cluster for accessing an instance of a specified volume in response to the mount-to-dismount lifespans and a user policy. The method selects the source cluster that may reduce access latency for the specified volume.

References throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The embodiment of the present invention calculates a mount-to-dismount lifespan for a plurality of clusters. In addition, the present invention selects a source cluster using the mount-to-dismount lifespans and a user policy. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays (FPGAs), programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within the modules, and may be embodied in any suitable form and organized within any suitable type of data structure. The operational data may be collected as a single data set, or may be distributed over different locations including different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
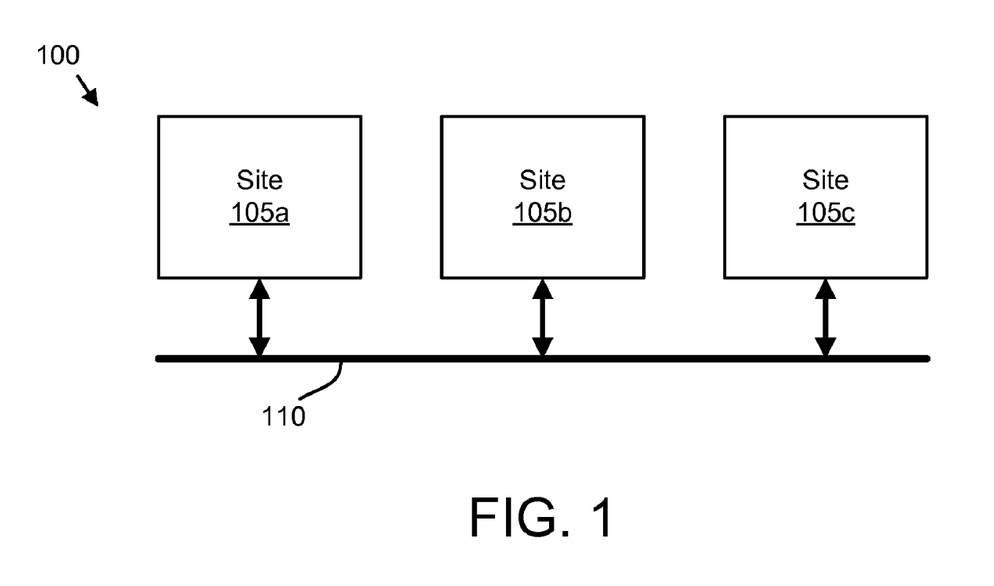
FIG. 1 is a schematic block diagram illustrating one embodiment of distributed sites in accordance with the present invention.

FIG. 1 is a schematic block diagram illustrating one embodiment of distributed sites 100 in accordance with the present invention. The distributed sites 100 include a plurality of sites 105. Each site 105 communicates with the other sites 105 over a network 110. The network 110 may be the Internet, a dedicated network, a combination of networks, and the like.

Each site 105 may include one or more storage systems as will be described hereafter. In addition, each site 105 may include bridges, routers, and the like that connect the storage systems to the network 110.

Figure 2:
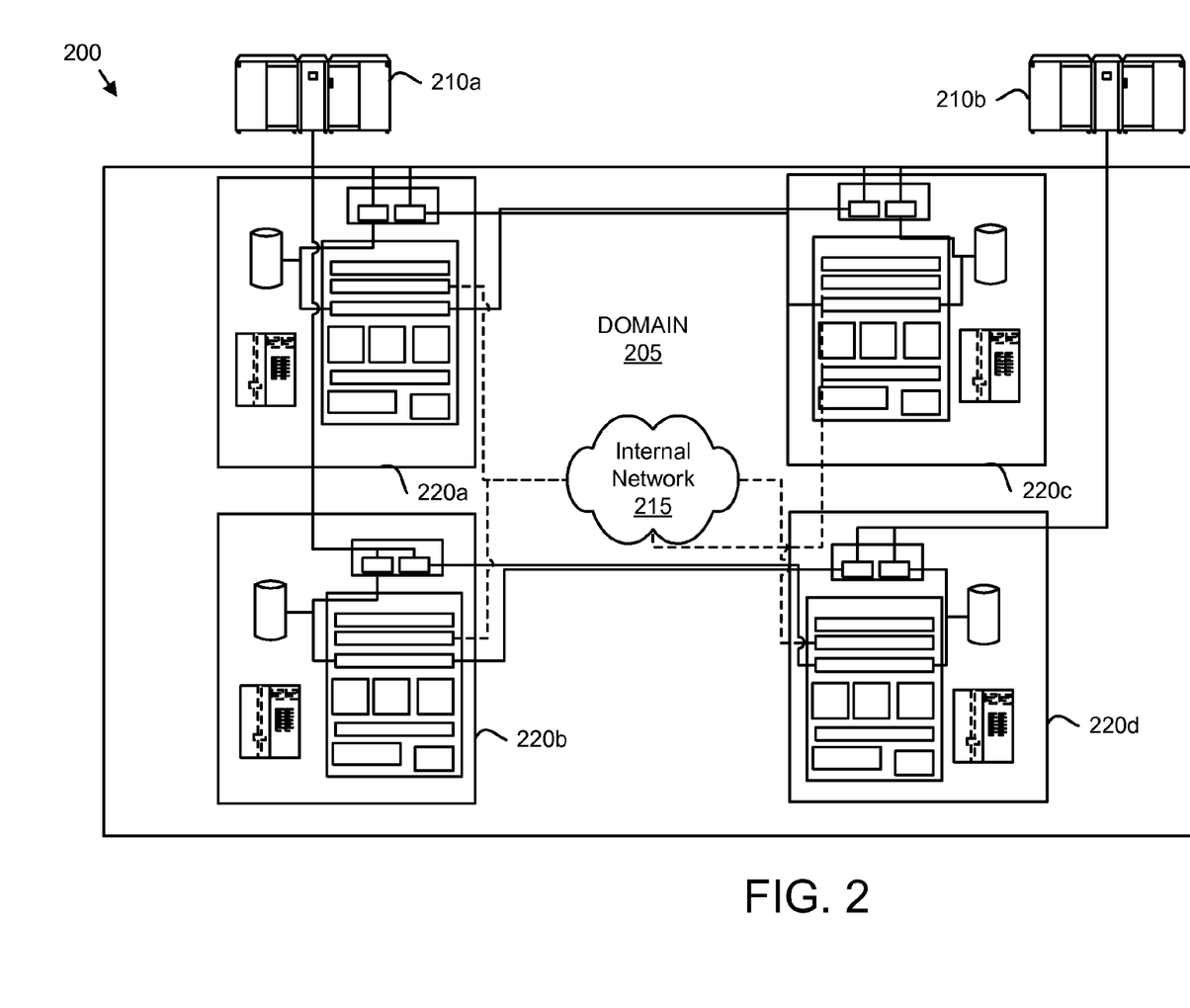
FIG. 2 is a schematic block diagram illustrating one embodiment of a storage system in accordance with the present invention.

FIG. 2 is a schematic block diagram illustrating one embodiment of a storage system 200 in accordance with the present invention. One or more storage systems 200 may be embodied in each site 105 of FIG. 1. The storage system 200 includes a plurality of hosts 210, a plurality of clusters 220, and an internal network 215. Although for simplicity, two (2) hosts 210, four (4) clusters 220, and one (1) internal network 215 are shown, any number of hosts 210, clusters 220, and networks 215 may be employed.

The clusters 220 each includes a library manager with magnetic tapes as will be described hereafter. The hosts 210 may initiate and run all tape jobs, wherein data is read from and written to the magnetic tapes in the clusters 220. The hosts 210 may be mainframe computers, servers, or the like. The hosts 210 may have the ability to run or host multiple operating systems. For example, the hosts 210 may run or may host multiple operating systems such Linux, Java, Windows or the like. Each of the hosts 210 of the storage system 200 may operate as the single mainframe computer, one or more servers, or as number of virtual machines. The hosts 210 may provide three levels of virtualization through logical partitions (LPARs) via the PR/SM facility, through virtual machines via the z/VM operating system, and through operating systems, notably z/OS with key-protected address spaces and goal-oriented workload scheduling.

The hosts 210 may communicate with the clusters 220 over the internal network 215 to access a plurality of magnetic tape drives, disk drives, and other storage devices through the clusters 220 as will be described hereafter. For example, a first host 210a may communicate over the internal network 215 to access a storage device and a magnetic tape through a first cluster 220a.

Each cluster 220 may be a hierarchical storage controller. The clusters 220 may provide a single point management for data to be read and stored, aggregating storage pools in which storage can easily be allocated to different hosts 210, scaling the storage system 200 by adding storage or storage control nodes, and a platform for implementing advanced functions such as fast-write cache, point-in-time copy, transparent data migration, and remote copy.

The clusters 220 may follow an "in-band" approach. The in-band approach may cause all input/output (I/O) requests and all management and configuration requests to be processed through a cluster 220.

Each of the clusters 220 may be interconnected between themselves and with the hosts 210 over the internal network 215 to access data written on the magnetic tape and/or to write data to the magnetic tape. The plurality of interconnected clusters 220 may form a domain 205 of the storage system 200. For example, in the depicted embodiment four (4) interconnected clusters 220 may form the domain 205 of the storage system 200.

The internal network 215 of the storage system 200 may be storage area network (SAN), a token ring network, or the like. The SAN may consist of a "fabric" through which the hosts 210 may communicate with the clusters 220 over the network 215. The fabric may include a Fibre Channel network, an Ethernet network, or the like. All elements may not share the same fabric for communication. The first host 210a may communicate with the first cluster 220a over one fabric. In addition, the first host 210a may communicate with a third cluster 220c over another fabric.

Figure 3:
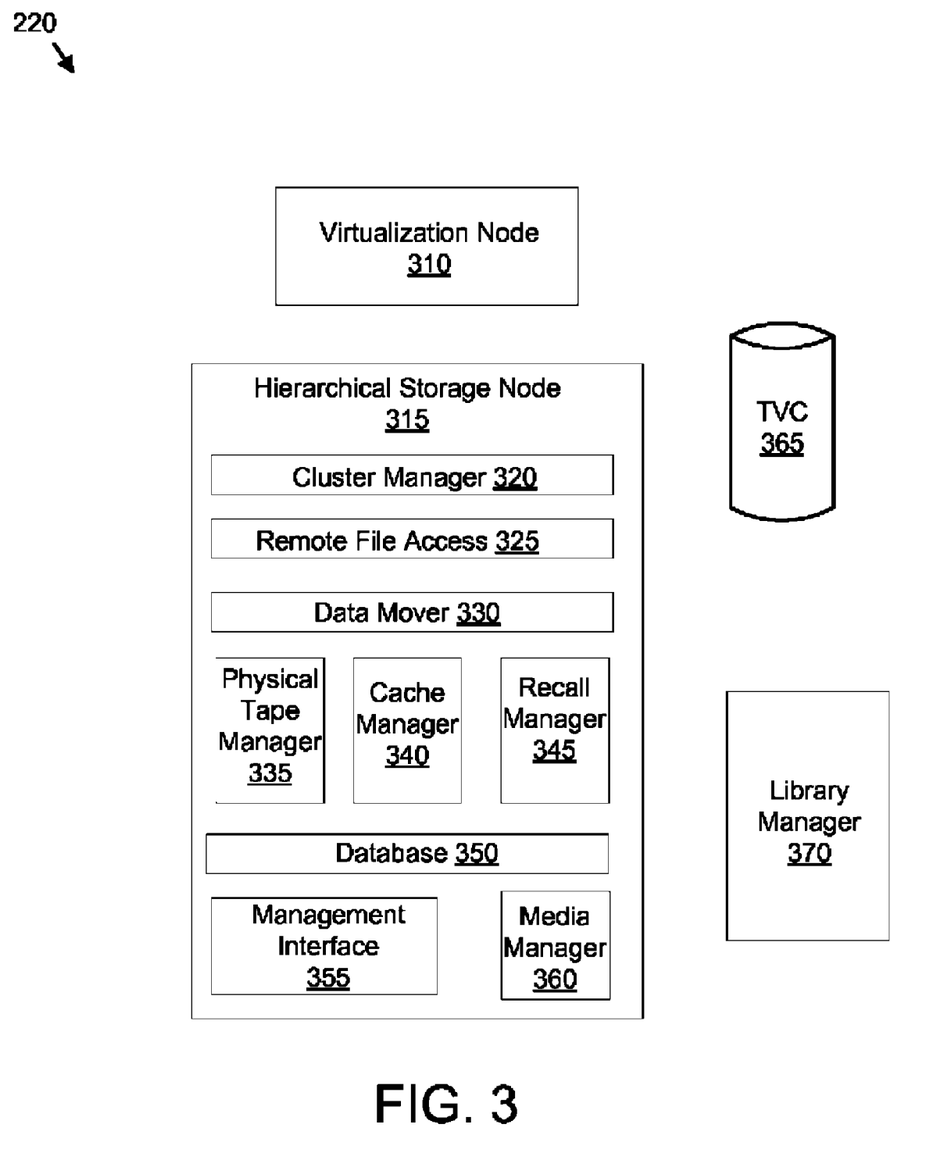
FIG. 3 is a schematic block diagram illustrating one embodiment of a cluster of the present invention.

FIG. 3 is a schematic block diagram illustrating one embodiment of a cluster 220 of the present invention. The cluster 220 is a cluster 220 of FIG. 2. The description of cluster 220 refers to elements of FIGS. 1-2, like numbers referring to like elements. The cluster 220 may include a virtualization node 310, a hierarchical storage node 315, a TVC 365, and a library manager 370.

A host 210 may initiate and run all tape jobs on the cluster 220. For example, a first host 210a access may result in an actuator movement of the library manager 370 through a physical tape manager 335 to move a tape cartridge from a storage area to a tape drive in order to access data written on the magnetic tape and/or to write data to the magnetic tape and/or TVC 365.

The virtualization node 310 may be an independent processor-based server with multiple connections to the internal network 215. The virtualization node 310 may include either a battery backup unit (BBU) and/or may have access to an uninterruptible power supply (UPS). The virtualization node 310 may contain a watchdog timer. The watchdog timer may ensure that a failing virtualization node 310 that is not able and/or takes a long time to recover may be restarted.

The virtualization node 310 may include one or more tape daemon (not shown). The tape daemon may emulate a tape drive of the cluster 220 to the host 210 as a virtual tape drive. The tape daemon may operate on a file that is either on the TVC 365 and/or may operate on a file in a remote TVC 365 of another cluster 220 through a remote file access 325.

The hierarchical storage node 315 may include a cluster manager 320, the remote file access 325, a data mover 330, the physical tape manager 335, a cache manager 340, a recall manager 345, a database 350, a management interface 355, and a media manager 360. The cluster manager 320 may coordinate operations between the plurality of clusters 220 in a grid topology.

The cluster manager 320 may use tokens to determine which cluster 220 has a current copy of the data. The tokens may be stored in the database 350. The cluster manager 320 may also coordinate copying data between the clusters 220. The cluster manager 320 may include one or more processors configured to execute computer readable programs as is well known to those of skill in the art.

The remote file access 325 may be a server, one or more processors, or the like. The remote file access 325 may provide a link to the TVC 365 for access by any remote cluster 220. The cluster manager 320 may include a computer readable program.

The data mover 330 may control the actual data transfer operations for copies performed between clusters 220 and also may transfer of data between physical tape media and the TVC 365. The data mover 330 may include a computer readable program.

The physical tape manager 335 may control the physical tapes in the cluster 220. The physical tape manager 335 may manage the physical tapes in multiple pools, reclamation, borrowing and returning of volumes from and to a common scratch pool, and movement of tapes between pools. The physical tape manager 335 may include a computer readable program.

The cache manager 340 may control the copying of data from the TVC 365 to the physical tapes and the subsequent removal of a redundant copy of data from the TVC 365. The cache manager 340 may also provide the control signals to balance data flow between the different components and the TVC 365. The cache manager 340 may include a computer readable program.

The recall manager 345 may queue and control recall of data into the TVC 365 from physical media for either a virtual tape drive or copies requested by the cluster manager 320. The recall manager 345 may include a computer readable program.

The database 350 may be a structured collection of records that may be stored on a hard disk drive. The records may include the locations of data on magnetic tape. The host 210 may write the data to the magnetic tape of the cluster 220 and/or may access the data from the magnetic tape using database addresses to provide the data to a user.

The management interface 355 may provide information about the cluster 220 to the user. Also, the management interface 355 may allow the user to control and configure the cluster 220. The management interface 355 may include a computer cathode ray tube (CRT), a liquid crystal display (LCD) screen, a keyboard, or the like, or exist as a web based interface.

The media manager 360 may manage the physical handling of the magnetic tapes of the cluster 220. Also, the media manager 360 may manage error recovery of the magnetic tapes of the cluster 220. The media manager 360 may diagnose errors and may determine if the errors are caused by the physical tape drives or by the physical tape media. Further, the media manager 360 may take appropriate action for error recovery.

The library manager 370 may include plurality of physical tape drives, a robotic accessor, and a plurality of physical tape media. The robotic accessor of the library manager 370 may move the magnetic tape to a tape drive assigned to the TVC 365. A virtual tape drive may be a logical construct that appears to the host 210 as a physical tape drive. The data may be read from or written to the magnetic tape of the tape drive through a read/write channel as is well known to those skilled in the art.

Each tape drive of the plurality of clusters 220 may employ one or more magnetic tapes to store the data. The magnetic tape may act as a storage media of the data in the storage system 200. The cluster 220 may employ any number of tape drives and magnetic tapes. For example, the storage system 200 may employ two (2) tape drives and two hundred fifty six (256) virtual drives.

The TVC 365 may contain data from tape volumes being operated on and stores additional volume data for rapid access. Operations such as read operations and write operations for a virtual tape drive mounting a volume may be routed through the TVC 365. Thus selecting a cluster 220 may select the cluster's TVC 365. All the magnetic tapes of the tape drive may be organized as one or more logical volumes or volumes. The volumes in the TVC 365 may be managed using a first in first out (FIFO) and/or a least recently used (LRU) algorithm.

The TVC 365 may be a rapidly accessible storage device. For example, the TVC 365 may be a hard disk drive with a storage capacity of five thousand four hundred gigabytes (5400 GB) or the like. In the storage system 200, the tape drive may cache data to the TVC 365 that is to be read from the logical volume and/or may cache data that is to be written to the logical volume. For example, the host 210 may make repeated writes to a virtual tape drive. The TVC 365 may store the written data on the hard disk drive without writing the data to the virtual magnetic tape. At a later time, the cache manager 340 may write the cached data to the magnetic tape of the cluster 220.

The virtualization node 310 that accessed a volume may be referred to as a mount-point. Choosing a remote cluster TVC 365 that was used for a recent mount-point for a logical volume may improve access to the volume. The high-availability, fast-write storage of the TVC 365 allows the hosts 210 to write data to the TVC 365 without having to wait for the data to be written to a physical disk.

The clusters 220 of each of the sites 105 form distributed store configuration. A second cluster 220b may create a secondary instance of a volume. The secondary instance may be synchronized with the primary copy on a first cluster 220a, wherein the secondary copy is updated any time the primary copy is updated. The secondary instance may be stored at a remote site 105 in order to ensure availability of data in case the primary instance becomes unavailable. Future mount-point accesses may choose the secondary copy as the primary copy. Transparent data migration may be used when adding, removing, and/or rebalancing data to magnetic tape.

Figure 4:
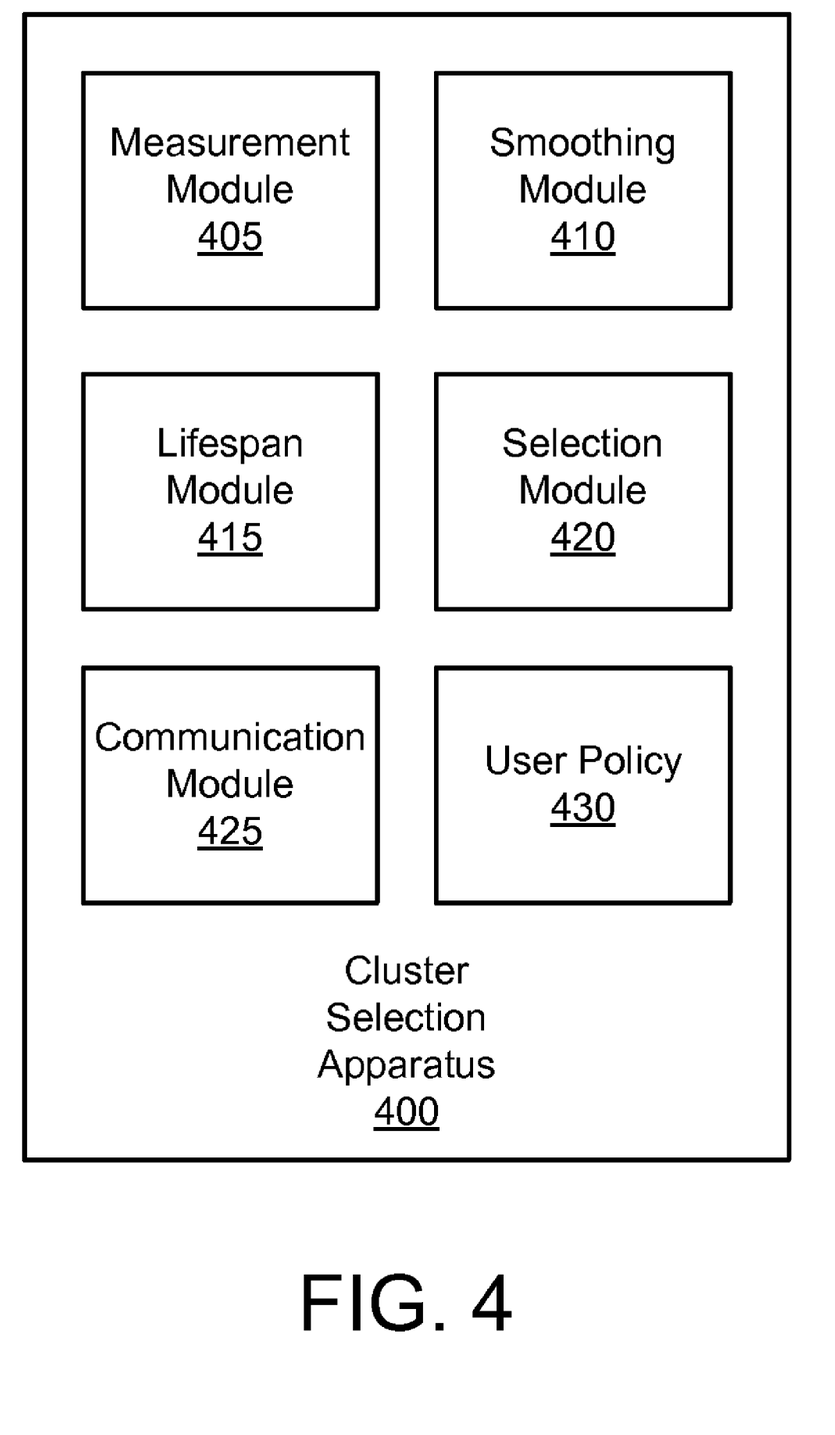
FIG. 4 is a schematic block diagram illustrating one embodiment of a cluster selection apparatus of the present invention.

FIG. 4 is a schematic block diagram illustrating one embodiment of a cluster selection apparatus 400 of the present invention. The apparatus 400 may be embodied in a host 210 and/or a cluster 220. In one embodiment, the apparatus 400 is embodied in the cluster manager 320. The description of the apparatus 400 refers to elements of FIGS. 1-3, like numbers referring to like elements. The apparatus 400 includes a measurement module 405, a smoothing module 410, a lifespan module 415, a selection module 420, a communication module 425, and a user policy 430.

The measurement module 405 comprises a computer readable program executing on a processor such as a processor of the cluster manager 320. In addition, the measurement module 405 measures system factors of the system 200 for a plurality of clusters 220 over a plurality of instances. The system factors may include factors for the tape drives, factors for the TVC 365, factors for the network 110, and/or factors for the internal network 215. In one embodiment, the system factors include a recall time, a free space of the TVC 365, pre-migrated space available, throttling values, a write throughput, a read throughput, a write response time, and a read response time.

The recall time may measure the time required to retrieve data of a volume which resides on physical tape media into the TVC 365. In one embodiment, the free space of the TVC 365 refers to unused storage addresses. The pre-migrated space available may be redundant storage data which has already been written to physical tape media and can be easily removed from TVC 365.

In one embodiment, the throttling values include known limitations to data transfer including a work load of the library manager 370, limitations of a network 110, and the like. The write throughput may be a quantity of data that may be written to the TVC 365 in a specified time interval. The read throughput may be a quantity of data that may be read from the TVC 365 in a specified time interval. The write response time may be a latency from issuing a write command, writing data, and responding to the command. The read response time may be a latency from issuing a read command to receiving data.

The clusters 220 are in communication over a network such as the network 110 and/or the internal network 215. Each cluster 220 may comprise a library manager 370 with at least one tape drive configured to access volumes stored on magnetic tape and at least one TVC 365.

The smoothing module 410 comprises a computer readable program executing on the processor such as the processor of the cluster manager 320. In addition, the smoothing module 410 applies a smoothing function to the system factors as will be described hereafter. Recent system factor instances are given higher weights.

The lifespan module 415 comprises a computer readable program executing on the processor such as the processor of the cluster manager 320. In addition, the lifespan module 415 calculates a mount-to-dismount lifespan for each cluster 220 from the smoothed system factors.

The selection module 420 selects a source cluster 220 for accessing an instance of a specified volume in response to the mount-to-dismount lifespans and the user policy 430. The selection module 420 comprises a computer readable program executing on the processor such as the processor of the cluster manager 320.

In one embodiment, the communication module 425 communicates with measurement modules 405 of remote clusters 220 to exchange system factors. The communication module 425 may allow a cluster 220 of a first site 105a to calculate mount-to-dismount lifespans for a plurality of clusters 220 at a plurality of sites 105. The user policy 430 may specify one or more policies for selecting a cluster 220 as will be described hereafter. The apparatus 400 selects the source cluster 220 with an affinity for the specified volume, reducing latency for accessing the specified volume.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and the symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
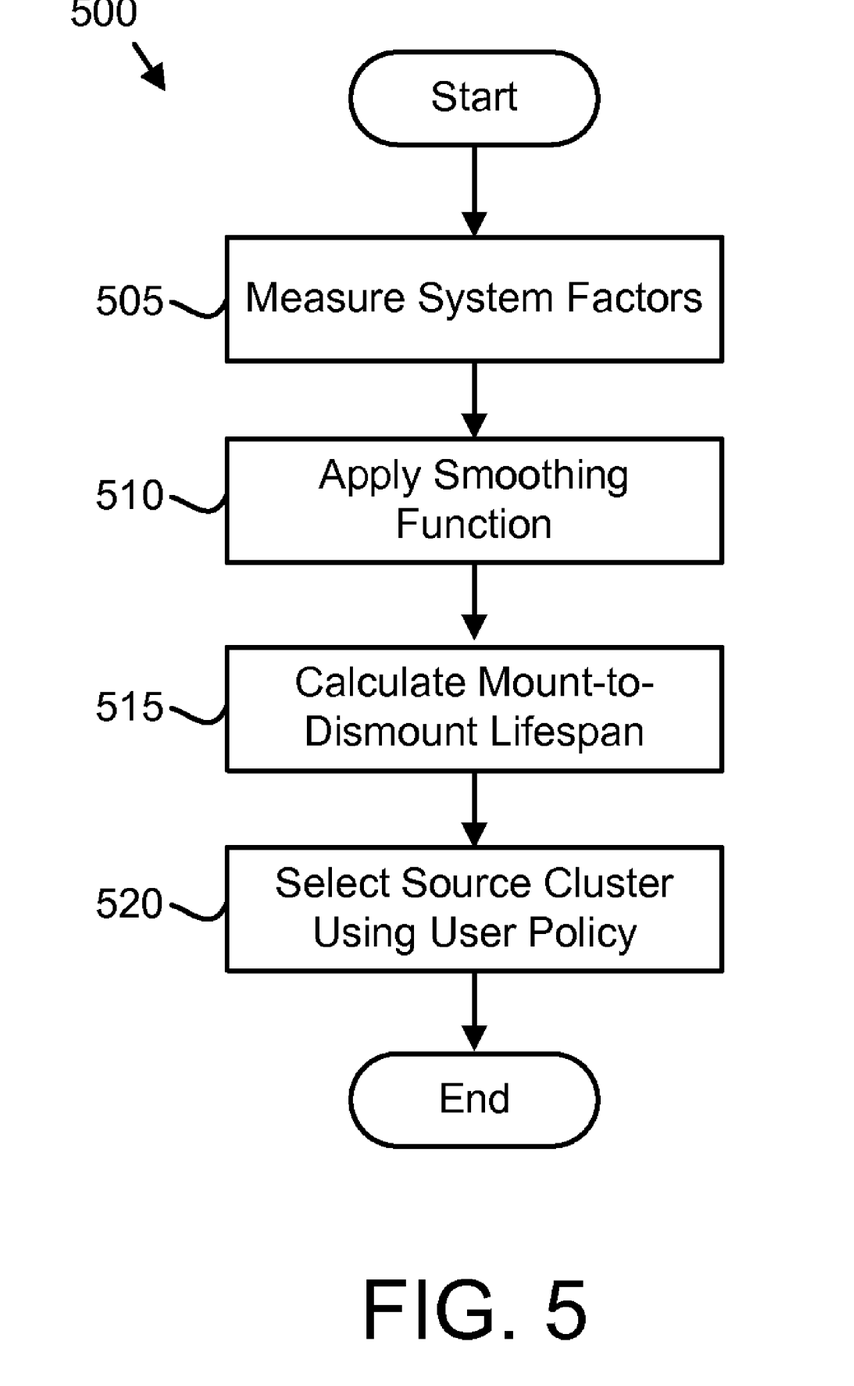
FIG. 5 is a schematic flow chart diagram illustrating one embodiment of a cluster selection method of the present invention.

FIG. 5 is a schematic flow chart diagram illustrating one embodiment of a cluster selection method of the present invention. The method 500 substantially includes the steps to carry out the functions presented above with respect to the operation of the described apparatus and system of FIGS. 1-4. In one embodiment, the method is implemented with a computer program product comprising a computer readable medium having a computer readable program. The computer readable program may be integrated into a computing system, such as the cluster manager 320 and/or hosts 210, wherein the program in combination with the computing system is capable of performing the method 500.

The method 500 starts and the measurement module 405 measures 505 system factors for a plurality of clusters 220 over a plurality of instances. For example, the measurement module 405 may measure 505 the recall time, free space of the TVC 365, pre-migrated space available, throttling values, write throughput, read throughput, write response time, and read response time each time a specified volume is mounted.

The smoothing module 410 applies 510 a smoothing function to the system factors. The smoothing function gives recent instances higher weights. In one embodiment, the smoothing function is an exponential smoothing function. In a certain embodiment, the smoothing function is Equation 1, where sf is the smoothed system factor, each k is a constant for a specified instance, s is a system factor for a specified instance, and n is a number of instances.

$$sf = k_0 s_0^n + k_1 s_1^{n-1} + k_2 s_2^{n-2} \ldots + k_n s_n \qquad \text{Equation 1}$$

The lifespan module 415 calculates 515 a mount-to-dismount lifespan for each cluster 220 from the smoothed system factors sf. In one embodiment, the mount-to-dismount lifespan l is calculated using equation 2, where each a is a specified constant, $t_r$ is the recall time, $e_s$ is the free space of the TVC 365, $p_s$ is the pre-migrated space available, $v_t$ is a throttling value, $w_t$ is the write throughput, $r_t$ is the read throughput, $w_r$ is the write response, and $r_r$ is the read response.

$$l = a_0 t_r + a_1 e_s + a_2 p_s + a_3 v_t + a_4 w_t + a_5 r_t + a_6 w_r + a_7 r_r \qquad \text{Equation 2}$$

The selection module 420 selects 520 a cluster 220 for accessing an instance of the specified volume in response to the mount-to-dismount lifespans and the user policy 430. In one embodiment, the selection module 420 selects 520 the cluster 220 with the shortest mount-to-dismount lifespan.

In one embodiment, the selection module 420 selects 520 a consistent source volume for duplication operations. For example, the selection module 420 may select a source volume of the first cluster 220a for each duplication operation even if a second cluster 220b had a shorter mount-to-dismount lifespan.

In one embodiment, the cluster 220 accesses the selected volume by creating a scratch volume. As used herein, a scratch volume comprises at least a portion of unwritten or stale magnetic tape which will be rewritten without first reading thus eliminating certain factors.

The communications module 425 may copy the specified volume to a selected first cluster 220a if a second cluster 220b with the only consistent instance of the specified volume is anticipated to become unavailable. The user policy 430 may supersede the mount-to-dismount lifespans in selecting 520 the cluster 220. In one embodiment, the user policy 430 requires that the specified volume be accessed from a local cluster 220. For example, if the specified volume is requested at the first site 105a, the user policy 430 may require that the specified volume be accessed from a cluster 220 of the first site 105a.

Alternatively, the user policy 430 may favor that the specified volume be accessed from a local cluster 220. For example, the user policy 430 may favor the local cluster 220 by adding a constant g to the mount-to-dismount lifespan of the local cluster 220 wherein adding g increases the likelihood that the local cluster 220 will be selected. The constant g may be a negative number. In one embodiment, the communication module 425 synchronizes an instance of the specified volume on the local cluster 220 if the local cluster specified volume instance is not consistent.

In one embodiment, the user policy 430 specifies that a cluster 220 with an instance of the volume in the TVC 365 is favored over a cluster 220 with an instance of the volume migrated to a hierarchical storage management system. In a certain embodiment, the user policy 430 requires selection of a specified set of immediate copy clusters over deferred consistency clusters. As used herein, an immediate copy cluster synchronizes a volume copy with a volume each time the volume is modified. A deferred consistency cluster may only synchronize the volume copy at specified times and/or under specified circumstances. For example, a deferred consistency cluster may synchronize the volume copy hourly.

In an alternate embodiment, the user policy 430 favors selection of the specified set of immediate copy clusters over the deferred consistency clusters. For example, the user policy 430 may favor the immediate copy clusters by adding the constant g to the mount-to-dismount lifespan of the immediate copy clusters wherein adding g increases the likelihood that the immediate copy clusters will be selected.

In one embodiment, the user policy 430 requires that a specified cluster 220 be chosen if the specified volume is a scratch volume. For example, the user policy 430 may require that the first cluster 220a is selected if the specified volume is a scratch volume.

In an alternate embodiment, the user policy 430 favors that a specified cluster 220 be chosen if the specified volume is a scratch volume. For example, the user policy 430 may favor the specified cluster 220 by adding the constant g to the mount-to-dismount lifespan of the specified cluster 220 wherein adding g increases the likelihood that the specified cluster 220 will be selected.

In one embodiment, the user policy 430 requires that a specified cluster 220 be chosen if the specified volume is not a scratch volume. For example, the user policy 430 may require that the second cluster 220b be selected if the specified volume is not a scratch volume.

In an alternate embodiment, the user policy 430 favors that a specified cluster 220 be chosen if the specified volume is not a scratch volume. For example, the user policy 430 may favor the specified cluster 220 by adding the constant g to the mount-to-dismount lifespan of the specified cluster 220 wherein adding g increases the likelihood that the specified cluster 220 will be selected.

In one embodiment, the user policy 430 does not favor clusters 220 with degraded library managers 370. As used herein, a library manager 370 is degraded if one or more functions are unavailable. The user policy 430 may disfavor the cluster 220 with the degraded library manager 370 by adding a constant −g to the mount-to-dismount lifespan of the specified cluster 220 wherein adding −g decreases the likelihood that the cluster 220 will be selected.

In one embodiment, the user policy 430 favors a first cluster 220a with the specified volume in the TVC 365 over a second cluster 220b wherein the specified volume is migrated, such as to a hierarchical storage system. The method 500 selects 520 the cluster 220 that may reduce latency for the specified volume. By selecting the cluster 220 among a plurality of clusters 220 with the TVC 365 that can most rapidly access the specified volume, the present invention may improve access to data.

Figure 6:
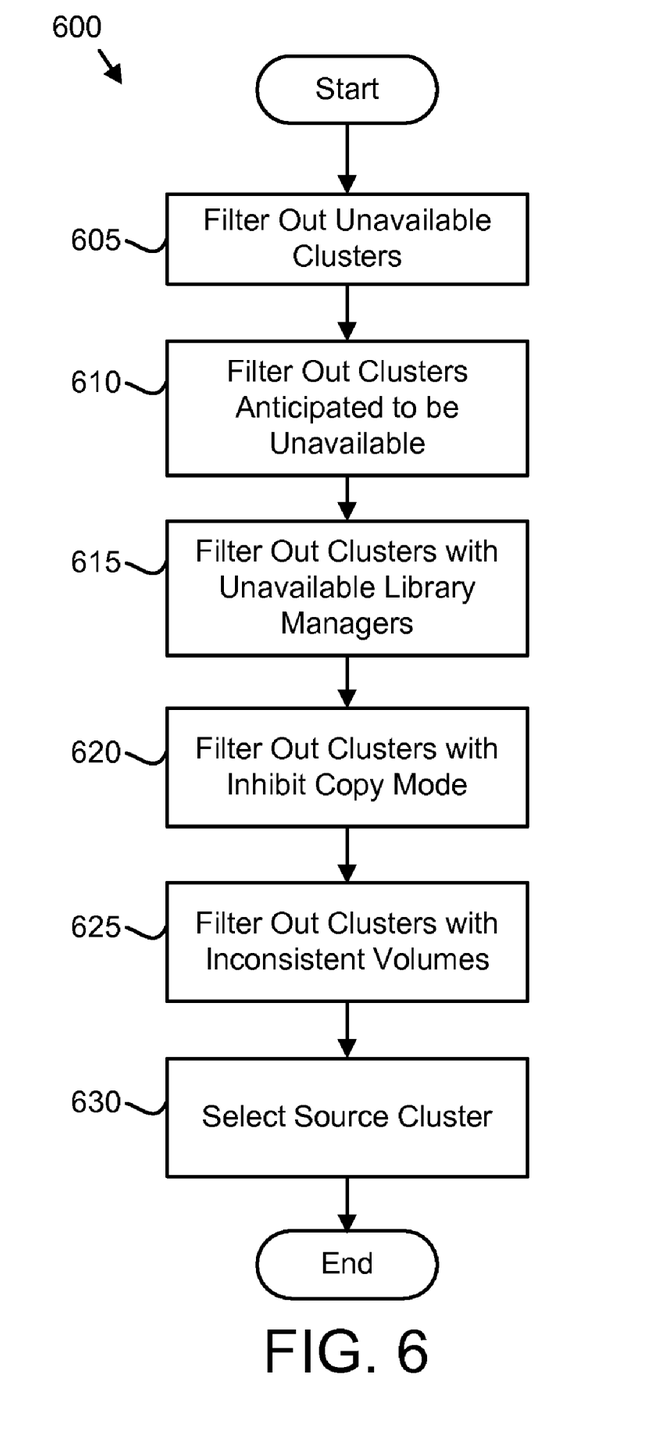
FIG. 6 is a schematic flow chart diagram illustrating one embodiment of a filtering method of the present invention.

FIG. 6 is a schematic flow chart diagram illustrating one embodiment of a filtering method 600 of the present invention. The method 600 substantially includes the steps to carry out the functions presented above with respect to the operation of the described apparatus and system of FIGS. 1-4 and step 520 of the method 500 of FIG. 5. In one embodiment, the method 600 is implemented with a computer program product comprising a computer readable medium having a computer readable program. The computer readable program may be integrated into a computing system, such as the cluster manager 320 and/or hosts 210, wherein the program in combination with the computing system is capable of performing the method 600.

The method 600 begins and in one embodiment, the selection module 420 filters out 605 unavailable clusters 220. As used herein, an unavailable cluster 220 may be temporarily unable to perform storage functions and/or access stored data. In addition, the selection module 420 may filter out 610 clusters 220 that are anticipated to be unavailable. For example, if a third cluster 220c is scheduled to shortly go off-line for maintenance, the selection module 420 may filter out 610 the third cluster 220c.

In one embodiment, selection module 420 filters out 615 clusters 220 with unavailable library managers 370. As used herein, an unavailable library manager 370 may be temporarily unable to access stored data on magnetic tape. In addition, the selection module 420 may filter out 615 clusters 220 with library managers 370 that are anticipated to be unavailable.

In a certain embodiment, the selection module 420 filters out 620 clusters 220 with an inhibit copy mode. The inhibit copy mode may inhibit copies to and/or from and/or at the cluster 220.

In one embodiment, the selection module 420 filters out 625 clusters 220 with inconsistent instances of the specified volume. In a certain embodiment, the selection module 420 filters out 625 the clusters 220 with inconsistent instances of the specified volume when the specified volume is not a scratch volume. The selection module 420 further selects 520 the cluster 220 for accessing an instance of the specified volume in response to the mount-to-dismount lifespans and the user policy 430 as described for step 520 of FIG. 5.

Figure 7:
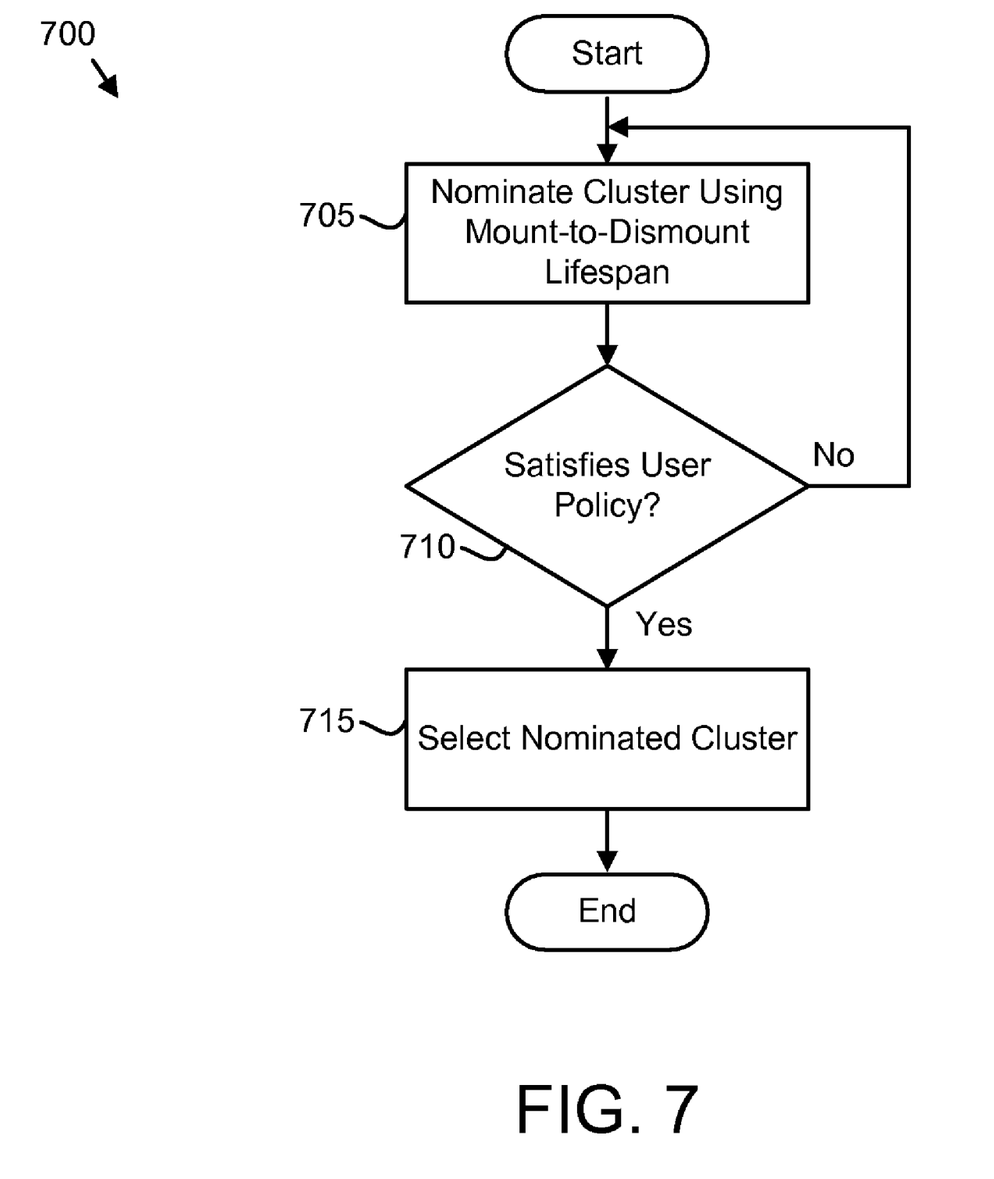
FIG. 7 is a schematic flow chart diagram illustrating one embodiment of a user policy based cluster selection method of the present invention.

FIG. 7 is a schematic flow chart diagram illustrating one embodiment of a user policy based cluster selection method 700 of the present invention. The method 700 substantially includes the steps to carry out the functions presented above with respect to the operation of the described apparatus and system of FIGS. 1-4 and step 520 of the method 500 of FIG. 5. In one embodiment, the method 700 is implemented with a computer program product comprising a computer readable medium having a computer readable program. The computer readable program may be integrated into a computing system, such as the cluster manager 320 and/or hosts 210, wherein the program in combination with the computing system is capable of performing the method 700.

The method 700 starts and in one embodiment, the selection module 420 nominates a cluster 220 using the mount-to-dismount lifespans calculated in step 515 of FIG. 5. The selection module 420 may nominate the cluster 220 with a shortest mount-to-dismount lifespan.

The selection module 420 further determines 710 if the nominated cluster 220 satisfies the user policy 430. For example, the selection module 420 may determine 420 if the nominated cluster 220 is a local cluster as required by the user policy 430.

If the nominated cluster 220 does not satisfy the user policy 430, the selection module 420 may nominate 705 another cluster 220. If the nominated cluster 220 satisfies the user policy 430, the selection module 420 may select 715 the nominated cluster 220. The method 700 applies the user policy 430 after nominating a cluster 220 using the mount-to-dismount lifespans.

Figure 8:
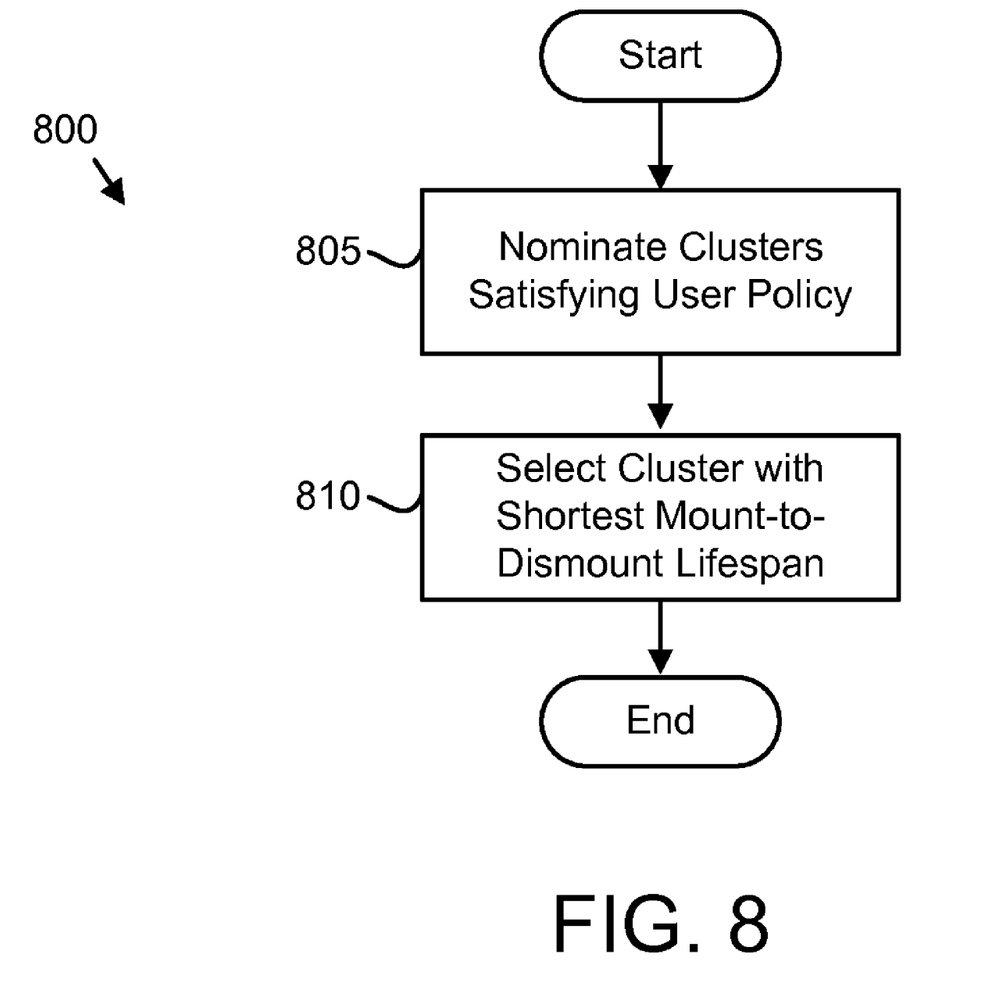
FIG. 8 is a schematic flow chart diagram illustrating one alternate embodiment of a user policy based cluster selection method of the present invention.

FIG. 8 is a schematic flow chart diagram illustrating one alternate embodiment of a user policy based cluster selection method 800 of the present invention. The method 800 substantially includes the steps to carry out the functions presented above with respect to the operation of the described apparatus and system of FIGS. 1-4 and step 520 of the method 500 of FIG. 5. In one embodiment, the method 800 is implemented with a computer program product comprising a computer readable medium having a computer readable program. The computer readable program may be integrated into a computing system, such as the cluster manager 320 and/or hosts 210, wherein the program in combination with the computing system is capable of performing the method 800.

The method 800 starts and in one embodiment, the selection module 420 nominates 805 each cluster 220 that satisfies the user policy 430. For example, the selection module 420 may nominate 805 each cluster 220 that is an immediate copy cluster.

The selection module 420 further selects 810 the cluster 220 with the shortest mount-to-dismount lifespan from among the nominated clusters as the selected cluster. The method 800 culls clusters 220 that do not satisfy the user policy 430 from consideration before selecting 810 a cluster 220.

Figure 9:
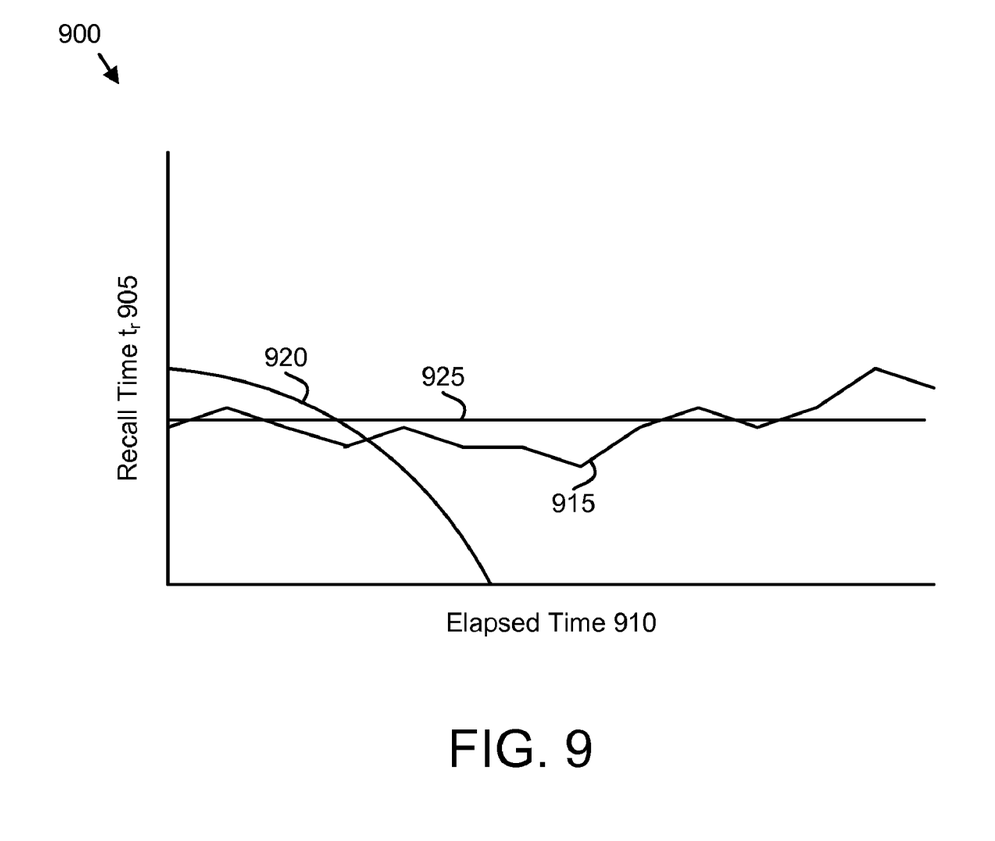
FIG. 9 is a drawing illustrating one embodiment of smoothing of the present invention.

FIG. 9 is a graph 900 illustrating one embodiment of smoothing of the present invention. The graph 900 includes a recall time axis 905 and an elapsed time axis 910. The recall time values 915 for a plurality of system factor instances are graphed. The recall time values 915 are multiplied by a smoothing function 920, resulting in a smoothed recall time value 925. The smoothed recall time value 925 weights recent instances of the recall time values 915 more heavily than later instances.

The embodiment of the present invention calculates 515 a mount-to-dismount lifespan for a plurality of clusters 220. In addition, the present invention selects 520 a cluster 220 using the mount-to-dismount lifespans. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a non-transitory computer useable medium having a computer readable program, wherein the computer readable program when executed on a computer causes the computer to:
   measure system factors for a plurality of clusters over a plurality of instances, wherein the clusters are in communication over a network and each cluster comprises at least one tape volume cache;
   apply a smoothing function to the system factors, wherein recent instances have higher weights;
   calculate a mount-to-dismount lifespan for each cluster from the smoothed system factors; and
   select a source cluster for accessing an instance of a specified volume in response to the mount-to-dismount lifespans and a user policy.

2. The computer program product of claim 1, wherein the computer readable program further causes the computer to select a consistent source volume for duplication operations.

3. The computer program product of claim 1, wherein the system factors comprise factors for the at least one tape volume cache, factors for at least one tape drive, and factors for the network.

4. The computer program product of claim 3, wherein the system factors are selected from a recall time, a free space of the tape volume cache, pre-migrated space available, throttling values, a write throughput, a read throughput, a write response time, and a read response time.

5. The computer program product of claim 4, wherein the mount-to-dismount lifespan for each cluster is calculated as $l=a_0 t_r + a_1 e_s + a_2 p_s + a_3 v_t + a_4 w_t + a_5 r_t + a_6 w_r + a_7 r_r$ where each a is a specified constant, $t_r$ is the recall time, $e_s$ is the free space of the tape volume cache, $p_s$ is the pre-migrated space available, $v_t$ is a throttling value, $w_t$ is the write throughput, $r_t$ is the read throughput, $w_r$ is the write response, and $r_r$ is the read response, and each a, $t_r$, $e_s$, $p_s$, $v_t$, $w_t$, $r_t$, $w_r$, and $r_r$ are real numbers.

6. The computer program product of claim 1, wherein the smoothing function is configured as an exponential smoothing function $sf = k_0 s_0^n + k_1 s_1^{n-1} + k_2 s_{21}^{n-2} \ldots + k_n s_n$ where each k is a constant for a specified instance, s is a system factor for a specified instance, and n is an integer number of instances.

7. The computer program product of claim 1, wherein the user policy supersedes the mount-to-dismount lifespans in selecting the cluster.

8. The computer program product of claim 7, wherein the user policy requires that the specified volume be accessed from a local cluster.

9. The computer program product of claim 8, wherein the computer readable program further causes the computer to synchronize an instance of the specified volume on the local cluster if the local cluster specified volume instance is not consistent.

10. The computer program product of claim 7, wherein the user policy favors that the specified volume be accessed from a local cluster.

11. The computer program product of claim 7, wherein the user policy requires selection of a specified set of immediate copy clusters over deferred consistency clusters.

12. The computer program product of claim 7, wherein the user policy favors selection of a specified set of immediate copy clusters over deferred consistency clusters.

13. The computer program product of claim 7, wherein the user policy requires that a specified cluster be chosen if the specified volume is a scratch volume.

14. The computer program product of claim 7, wherein the user policy favors that a specified cluster be chosen if the specified volume is a scratch volume.

15. The computer program product of claim 7, wherein the user policy requires that a specified cluster be chosen if the specified volume is not a scratch volume.

16. The computer program product of claim 7, wherein the user policy favors that a specified cluster be chosen if the specified volume is not a scratch volume.

17. The computer program product of claim 1, wherein the computer readable program further causes the computer to:
   filter out unavailable clusters;
   filter out clusters that are anticipated to be unavailable;
   filter out clusters with unavailable library managers; and
   filter out clusters with an inhibit copy mode.

18. The computer program product of claim 1, wherein the user policy does not favor clusters with degraded library managers.

19. The computer program product of claim 1, wherein the computer readable program further causes the computer to filter out clusters with inconsistent instances of the specified volume when the specified volume is not scratch.

20. The computer program product of claim 1, wherein the computer readable program further causes the computer to access the selected volume by creating a scratch volume.

21. The computer program product of claim 1, wherein the computer readable program further causes the computer to copy the specified volume to a first cluster if a second cluster with an only consistent instance of the specified volume is anticipated to become unavailable.

22. The computer program product of claim 1, wherein the user policy favors a first cluster with the specified volume in the tape volume cache over a second cluster where the specified volume is migrated.

23. An apparatus to select a cluster, the apparatus comprising:
   a measurement module comprising a computer readable program executing on a processor and configured to measure system factors for a plurality of clusters over a plurality of instances, wherein the clusters are in communication over a network and each cluster comprises at least one tape volume cache;
   a smoothing module comprising a computer readable program executing on the processor and configured to apply a smoothing function to the system factors, wherein recent instances have higher weights;

a lifespan module comprising a computer readable program executing on the processor and configured to calculate a mount-to-dismount lifespan for each cluster from the smoothed system factors; and a selection module comprising a computer readable program executing on the processor and configured to select a source cluster for accessing an instance of a specified volume in response to the mount-to-dismount lifespans and a user policy.

24. The apparatus of claims 23, wherein the system factors comprise factors for the at least one tape volume cache, factors for at least one tape drive, and factors for the network.

25. The apparatus of claim 24, wherein the system factors are selected from a recall time, a free space of the tape volume cache, pre-migrated space available, throttling values, a write throughput, a read throughput, a write response time, and a read response time.

26. The apparatus of claim 25, wherein the mount-to-dismount lifespan for each cluster is calculated as $l=a_0t_r+a_1e_s+a_2p_s+a_3v_t+a_4w_t+a_5r_t+a_6w_r+a_7r_r$ where each a is a specified constant, $t_r$ is the recall time, $e_s$ is the free space of the tape volume cache, $p_s$ is the pre-migrated space available, $v_t$ is a throttling value, $w_t$ is the write throughput, $r_t$ is the read throughput, $w_r$ is the write response, and $r_r$ is the read response, and each a, $t_r$, $e_s$, $p_s$, $v_t$, $w_t$, $r_t$, $w_r$, and $r_r$ are real numbers.

27. A system to select a cluster, the system comprising:
a network;
a plurality of sites in communication over the network, each site comprising at least one host and a storage system comprising a plurality of clusters, each cluster comprising at least one tape drive configured to access volumes stored on magnetic tape, at least one tape volume cache, and a cluster manager configured to execute computer readable programs using a processor and a memory, wherein the software readable programs comprise
  a measurement module configured to measure system factors for the plurality of clusters over a plurality of instances;
  a smoothing module configured to apply a smoothing function to the system factors, wherein recent instances have higher weights;
  a communication module configured to communicate system factors between the measurement modules of the clusters;
  a lifespan module configured to calculate a mount-to-dismount lifespan for each cluster from the smoothed system factors; and
  a selection module configured to select a source cluster for accessing an instance of a specified volume in response to the mount-to-dismount lifespans and a user policy.

28. The system of claim 27, wherein each cluster includes at least one library manager that embodies the at least one tape drive.

29. A method for deploying computer infrastructure, comprising integrating computer readable program into a computing system, wherein the program in combination with the computing system is capable of performing the following:

measuring system factors for a plurality of clusters over a plurality of instances, wherein the clusters are in communication over a network and each cluster comprises at least one tape drive configured to access volumes stored on magnetic tape and at least one tape volume cache;

applying a smoothing function to the system factors, wherein recent instances have higher weights;

calculating a mount-to-dismount lifespan for each cluster from the smoothed system factors; and selecting a source cluster for accessing an instance of a specified volume in response to the mount-to-dismount lifespans and a user policy.

30. The method of claim 29, further comprising selecting a consistent source volume for duplication operations.

31. The method of claim 29, wherein the system factors comprise factors for the at least one tape volume cache, factors for the at least one tape drive, and factors for the network.

32. The method of claim 31, wherein the system factors are selected from a recall time, a free space of the tape volume cache, pre-migrated space available, throttling values, a write throughput, a read throughput, a write response time, and a read response time.

33. The method of claim 32, wherein the mount-to-dismount lifespan for each cluster is calculated as $l=a_0t_r+a_1e_s+a_2p_s+a_3v_t+a_4w_t+a_5r_t+a_6w_r+a_7r_r$ where each a is a specified constant, $t_r$ is the recall time, $e_s$ is the free space of the tape volume cache, $p_s$ is the pre-migrated space available, $v_t$ is a throttling value, $w_t$ is the write throughput, $r_t$ is the read throughput, $w_r$ is the write response, and $r_r$ is the read response, and each a, $t_r$, $e_s$, $p_s$, $v_t$, $w_t$, $r_t$, $w_r$, and $r_r$ are real numbers.

34. The method of claim 33, wherein the smoothing function is configured as an exponential smoothing function $sf=k_0s_0^n+k_1s_1^{n-1}+k_2s_2^{n-2}\ldots+k_ns_n$ where each k is a constant for a specified instance, s is a system factor for a specified instance, and n is an integer number of instances.

35. An apparatus to select a cluster, the apparatus comprising:

means for measuring system factors for a plurality of clusters over a plurality of instances, wherein the clusters are in communication over a network and each cluster comprises at least one tape drive configured to access volumes stored on magnetic tape and at least one tape volume cache and wherein the system factors are selected from a recall time, a free space of the tape volume cache, pre-migrated space available, throttling values, a write throughput, a read throughput, a write response time, and a read response time;

means for applying an exponential smoothing equation $sf=k_0s_0^n+k_1s_1^{n-1}+k_2s_2^{n-2}\ldots+k_ns_n$ to the system factors, where each k is a constant for a specified instance, s is a system factor for a specified instance, and n is an integer number of instances;

means for calculating a mount-to-dismount lifespan for each cluster from the smoothed system factors; and means for selecting a source cluster for accessing an instance of a specified volume in response to the mount-to-dismount lifespans and a user policy.

* * * * *